United States Patent
Huang

(10) Patent No.: US 9,760,121 B2
(45) Date of Patent: Sep. 12, 2017

(54) METHOD FOR USING GLASS TOUCH SCREEN PROTECTOR

(71) Applicant: AEVOE INTERNATIONAL LTD., Tortola (VG)

(72) Inventor: Cheng-Su Huang, Taipei (TW)

(73) Assignee: AEVOE INTERNATIONAL LTD., Tortola (VG)

( * ) Notice: Subject to any disclaimer, the term of this patent is extended or adjusted under 35 U.S.C. 154(b) by 157 days.

(21) Appl. No.: 14/747,570

(22) Filed: Jun. 23, 2015

(65) Prior Publication Data

US 2016/0091928 A1 Mar. 31, 2016

Related U.S. Application Data

(62) Division of application No. 14/663,285, filed on Mar. 19, 2015, now Pat. No. 9,092,195.

(Continued)

(51) Int. Cl.
*G06F 1/16* (2006.01)
*B32B 17/06* (2006.01)
(Continued)

(52) U.S. Cl.
CPC .............. *G06F 1/1637* (2013.01); *B32B 7/12* (2013.01); *B32B 17/064* (2013.01); *B32B 27/30* (2013.01);
(Continued)

(58) Field of Classification Search
CPC .................................................... G06F 1/1637
(Continued)

(56) References Cited

U.S. PATENT DOCUMENTS 3,948,662 A 4/1976 Alston et al.
3,950,580 A 4/1976 Boudet
(Continued)

FOREIGN PATENT DOCUMENTS

DE 19808535 A1 9/1999
EP 1471415 A2 10/2004
(Continued)

OTHER PUBLICATIONS

Non-Final Office Action mailed Jun. 25, 2014; in U.S. Appl. No. 12/780,443.
(Continued)

*Primary Examiner* — Brent O'Hern
(74) *Attorney, Agent, or Firm* — Polsinelli PC

(57) ABSTRACT

Method is provided which includes mounting a touch screen protector to the front face of a portable electronic device. The front face has a declining surface portion extending along the outer perimeter thereof. The touch screen protector includes a planar sheet having a front side and a back side, an outer perimeter corresponding in shape to the device, and a transparent window portion. An opaque band is applied around the perimeter of the planar sheet, surrounding the transparent window portion. An adhesive layer is applied to the back side of the planar sheet for mounting the touch screen protector on the device. The planar sheet is sufficiently stiff such that a portion of the glass touch screen protector hangs over the declining surface portion of the front face of the portable electronic device when mounted thereon.

11 Claims, 4 Drawing Sheets

Related U.S. Application Data

(60) Provisional application No. 62/057,901, filed on Sep. 30, 2014.

(51) Int. Cl.
```
G06F 3/041    (2006.01)
B32B 7/12     (2006.01)
B32B 27/30    (2006.01)
B32B 37/12    (2006.01)
B32B 37/18    (2006.01)
H04N 3/20     (2006.01)
H04M 11/02    (2006.01)
H04N 7/18     (2006.01)
B29C 63/00    (2006.01)
```

(52) U.S. Cl.
CPC .............. *B32B 37/12* (2013.01); *B32B 37/18* (2013.01); *G06F 3/041* (2013.01); *B29C 63/0056* (2013.01); *B32B 2255/00* (2013.01); *B32B 2307/41* (2013.01); *B32B 2307/412* (2013.01); *B32B 2457/20* (2013.01); *B32B 2457/208* (2013.01); *G06F 2200/1634* (2013.01); *G06F 2203/04107* (2013.01); *H04M 11/025* (2013.01); *H04N 3/20* (2013.01); *H04N 7/181* (2013.01)

(58) Field of Classification Search
USPC ........................................... 345/173; 348/173
See application file for complete search history.

(56) References Cited

U.S. PATENT DOCUMENTS

| | | | |
|---|---|---|---|
| 4,889,754 | A | 12/1989 | Vargas |
| 5,486,883 | A | 1/1996 | Candido |
| 5,668,612 | A | 9/1997 | Hung |
| 6,469,752 | B1 | 10/2002 | Ishikawa et al. |
| 6,536,589 | B2 | 3/2003 | Chang |
| 6,555,235 | B1 | 4/2003 | Aufderheide et al. |
| 6,559,902 | B1 | 5/2003 | Kusuda et al. |
| 6,667,738 | B2 | 12/2003 | Murphy |
| 6,750,922 | B1 | 6/2004 | Benning |
| 6,777,055 | B2 | 8/2004 | Janssen et al. |
| 6,800,378 | B2 | 10/2004 | Hawa et al. |
| 6,864,882 | B2 | 3/2005 | Newton |
| 6,879,319 | B2 | 4/2005 | Cok |
| 6,995,976 | B2 | 2/2006 | Richardson |
| 7,070,837 | B2 | 7/2006 | Ross |
| 7,226,176 | B1 | 6/2007 | Huang |
| 7,495,895 | B2 | 2/2009 | Carnevali |
| 8,044,942 | B1 | 10/2011 | Leonhard et al. |
| 9,092,195 | B1 | 7/2015 | Huang |
| 9,292,128 | B1 * | 3/2016 | Huang ................. G06F 1/1643 |
| 2002/0101411 | A1 | 8/2002 | Chang |
| 2002/0122925 | A1 | 9/2002 | Liu et al. |
| 2003/0012936 | A1 | 1/2003 | Draheim et al. |
| 2003/0087054 | A1 | 5/2003 | Janssen et al. |
| 2003/0110613 | A1 | 6/2003 | Ross |
| 2004/0004605 | A1 | 1/2004 | David |
| 2004/0109096 | A1 | 6/2004 | Anderson et al. |
| 2004/0227722 | A1 | 11/2004 | Friberg et al. |
| 2006/0114245 | A1 | 6/2006 | Masters et al. |
| 2007/0181456 | A1 | 8/2007 | Kusuda et al. |
| 2007/0212508 | A1 | 9/2007 | Mase |
| 2008/0030631 | A1 | 2/2008 | Gallagher |
| 2008/0055258 | A1 | 3/2008 | Sauers |
| 2010/0026646 | A1 | 2/2010 | Xiao et al. |
| 2010/0102197 | A1 | 4/2010 | Mcintyre |
| 2010/0238119 | A1 | 9/2010 | Dubrovsky et al. |
| 2010/0245273 | A1 | 9/2010 | Hwang et al. |
| 2010/0270189 | A1 | 10/2010 | Pedersen, II et al. |
| 2011/0279383 | A1 | 11/2011 | Wilson et al. |

FOREIGN PATENT DOCUMENTS

| | | |
|---|---|---|
| JP | 2002328613 A | 11/2002 |
| TW | 200700793 | 1/2007 |
| TW | 201027992 A | 7/2010 |
| WO | 03052678 A1 | 6/2003 |

OTHER PUBLICATIONS

Non-Final Office Action mailed Nov. 29, 2013; in U.S. Appl. No. 13/411,372.
Non-Final Office Action mailed Jan. 16, 2014; in U.S. Appl. No. 14/078,245.
Non-Final Office Action mailed Dec. 23, 2014; in U.S. Appl. No. 14/485,196.
Visor AG—Screen Protector for iPad; http://store.moshimonde.com/ivisor-ag-ipad.html; published 2004-2010 and retrieved Jun. 8, 2011.
Amendment in Response to the Office Action mailed Jul. 12, 2005; in U.S. Appl. No. 10/436,594.
Saecke, Jake; "Appletell reviews the iVisor AG for iPad", appletell.com Sep. 15, 2010; http://www.appletell.com/apple/comment/appletell-reviews-ivisor-ag-for-ipad.
Visor AG—Screen protector for iPad; 100% Bubble Free iVisor AG iPad Screen Protector ; http://store.moshimonde.com/ivisor-ag-ipad.html; published 2004-2010 and retrieved on Jun. 8, 2011.
VisorAG for iPad 2 Black; http://store.moshimonde.com/ivisorage-for-ipad2-black.html; published 2004-2010 and retrieved Jun. 8, 2011.
Visor AG for iPhone 4 white; http://store.moshimonde.com/ivisor-ag-iphone4-white.html; published 2004-2010 and retrieved Jun. 8, 2011.
Visor AG for iPhone 4 black; http://store.moshimonde.com/ivisor-ag-iphone4-black.html.; published Oct. 2004 and retrieved Jun. 8, 2011.
Visor AG for iPad 2 black; http://store.moshimonde.com/ivisorag-for-ipad2-black.html; published 2004-2010 and retrieved Jun. 8, 2011.
Visor AG for iPad 2 white; http://store.moshimonde.com/ivisor-for-ipad2-white.html.; published 2004-2010 and retrieved Jun. 8, 2011.
Visor XT Crystal Clear Protector for iPad; http://store.moshimonde.com/ivisor-xt-ipad.html; published 2004-2010 and retrieved Jun. 8, 2011.
Screen Protectors Incipio Technologies ; http://incipiotech.com/tag/screen-protectors; 2008 and retrieved Jun. 8, 2011.
SGP iPhone 4 Screen and Body Protector Set Incredible Shield Series ; published 2010 ; http://www.sgpstore.com/cell-phone/apple-iphone/iphone-4/sgp-iphone-4-screen-body-protector-set-incredible-shield-series.html.
What makes NuShield Screen Protectors Superior; http://www.nushield.com/technology.php. retrieved Jan. 9, 2015.
"Invisible Shield" zagg.com published 2005-2011; http://www.zagg.com/invisibleshield/apple-ipad-2-3g-cases-screen-protectorscovers-skins-shields-1.php.
Machine translation for DE19808535; published Sep. 2, 1999 and retrieved on Jul. 18, 2011.
Machine translation for JP2002328613; published on Nov. 15, 2002.
English abstract for TW200700793; published Jan. 1, 2007 and published Jan. 9, 2015.
Machine translation for TW201027992; published Jul. 16, 2010.

* cited by examiner

METHOD FOR USING GLASS TOUCH SCREEN PROTECTOR

CROSS-REFERENCE TO RELATED APPLICATIONS

The present application is a divisional application of U.S. application Ser. No. 14/663,285, filed Mar. 19, 2015, issued as U.S. Pat. No. 9,092,195, which claims the benefit of U.S. provisional application No. 62/057,901, filed Sep. 30, 2014, each of the aforementioned applications are incorporated by reference herein in their entirety.

FIELD

The present disclosure relates to a glass touch screen protector. In particular, the disclosure relates to a glass touch screen protector for mobile hand held devices.

BACKGROUND

With the ever increasing popularity of the touch screen portable electronic devices, a demand for effective touch screen protectors has developed. Several kinds of touch screen protectors are currently available. For example, many touch screen protectors employ polyethylene terephthalate (PET) or some type of transparent plastic to guard and protect the display screen. Additionally, many commercial touch screen protectors have a tendency to trap air bubbles and dust, despite careful application. When in use, the touch screen protectors are in direct physical contact with the touch screen of the electronic device, either by static or application of adhesives. Additionally, when the screen protectors are removed, diligent cleaning may be needed to restore the touch screen to its original luster.

BRIEF DESCRIPTION OF THE DRAWINGS

Implementations of the present application will now be described, by way of example only, with reference to the attached figures, wherein.

DETAILED DESCRIPTION

Figure 1:
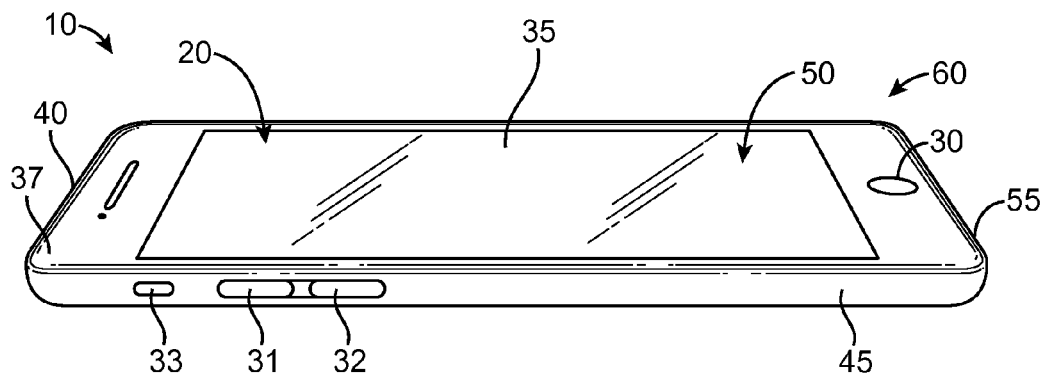
FIG. 1 is a diagram of an exemplary portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, the embodiments described herein can be practiced without these specific details. In other instances, methods, procedures and components have not been described in detail so as not to obscure the related relevant function being described. Also, the description is not to be considered as limiting the scope of the implementations described herein. It will be understood that descriptions and characterizations of embodiments set forth in this disclosure are not to be considered as mutually exclusive, unless otherwise noted.

The following definitions are used in this disclosure: The term "periphery" as used herein means the outermost part or region within a precise boundary. Accordingly the "peripheral direction" will be understood as extending from the interior toward the exterior outer periphery or edge of an area, such as a glass sheet. The term "touch screen portion" as used herein means the functional portion of the touch screen of the portable electronic device. The term "non-functional band around the perimeter" as used herein means the area surrounding the touch screen portion of the portable electronic device which can be made of a different material or made of the same material as the touch screen but is not touch sensitive. Generally, the term "touch screen" as used herein means one or more glass sheets that include the operable touch screen portion and the non-functional band around the perimeter of the touch screen portion. The touch screen may also include one or more inoperable portions, however, such touch screen will always include an operable touch screen portion. In many recent devices, the touch screen portion makes up the vast majority touch screen, with the non-functional band around the perimeter taking up only a small area of the touch screen. The term "front face" of a portable electronic device refers to the top surface which can be seen from an overhead view. The term "anti-static" is used to mean that the glass sheet(s) does not generate static electricity when contacted or rubbed by the user. The term "bevel" means a slanted surface or edge. The term "taper" means a gradual diminution of thickness, diameter, or width in an elongate object.

A glass touch screen protector can be used to protect touch screens of many different kinds of portable electronic devices, such as a mobile telephone, reading device, music device, viewing device, navigation device or other portable electronic devices. Examples of such devices are iPhone, Nook, iPod, iPad, Droid, and GPS navigation systems. The nature of the glass touch screen protector and its design enable specific embodiments to be adapted to conform to the touch screen of any such portable electronic device.

More recently, many portable electronic devices have begun to have a declining curved edge along the outer perimeter of the front face of the device. This declining edge can also be referred to herein as a beveled, chamfered or curved edge. The declining edge refers to a portion which connects the flat portion of the touch screen with a side edge of the device and which is not perpendicular to either. The declining edge portion around the perimeter can be either the touch screen and/or other segment of the front face surrounding the touch screen. In some instances, the touch screen will curve seamlessly to the side edge. In other examples, the touch screen may terminate and another component of the front face of the device may extend to the side edge.

In some examples of the present disclosure, the dimensions, that is, the length and width, of the glass touch screen protector can be the same dimensions as a top face of a portable electronic device. The touch screen protector can be planar and configured to extend to the outermost edge of a portable electronic device. The portable electronic device can have a top face which extends toward its periphery in a planar, beveled, tapered, or any similar fashion. The touch screen protector can have a glass sheet on a top side of the touch screen of the touch screen protector.

The touch screen protector can have an opaque band, such as a paint layer, disposed on a bottom side of the glass sheet. The opaque band can be a film, coating, ceramic, metal, pigment, dye, paint, tinting or any material which reduces the transmission of light. The opaque band can be on the bottom side of the glass sheet and/or formed within the glass sheet itself. The opaque band can essentially conform to the non-functional band that surrounds the touch screen portion of the portable electronic device. The opaque band can essentially conform to the non-functional band that surrounds the touch screen portion and a declining edge portion of the portable electronic device.

The opaque band can be a paint layer which can be 1.0 mm or less in thickness. An adhesive layer can be applied to the entire, or a substantial portion of the underside of the paint layer and the glass sheet. In at least one example, because the opaque band extends around the perimeter of the glass sheet, the adhesive layer can be applied to the opaque band (such as a paint layer) as well as directly to the glass sheet in the interior portion of the glass sheet. The glass sheet may also have an anti-shatter membrane on its underside, made up of PET, for example, or a transparent plastic. Additionally, the touch screen protector can have corners that are rounded or sharp to match the corners of any portable electronic device. The touch screen protector can also have corners and sides that are configured to conformance fit to the shape of the portable electronic device.

One example is shown in FIG. 1, where there is illustrated a portable electronic device 10 which is sized to be hand held. The portable electronic device 10 can have a touch screen 20. The touch screen 20 has a touch screen portion 35 for operation of the device as well as non-functional band 37 around the perimeter 40.

The portable electronic device 10 can also have a general functional button 30 as well as other functional buttons such as volume 31, 32 or mute button 33. Notably, the device 10 has a side edge 45 and a front face having a flat (or substantially flat) portion 50. The flat portion 50 of the touch screen 20 curves to the side edge 45 via curved portion 55. In other examples, the side edge 45 is itself curved, arc shaped or parabolic, and in any of these instances the extreme end may be considered the side edge 45. The curved portion 55 can be made up of a portion of the touch screen 20. In some instances, prior to the curved portion 55 or along its length the touch screen 20 may terminate and the surface continues as a non-functional plastic or metal surface. Accordingly, the front face 60 of the portable device 10 includes both the flat surface 50 and the curved portion 55, the entirety of which may be the touch screen 20, or as noted, may terminate as it extends toward the periphery of the front face 60 and continue as a non-functional plastic or metal surface.

In some newer mobile devices, the non-functional band 37 is omitted, minimized or reduced. In such examples, for example, there may be no non-functional band 37 on the lateral sides of the touch screen portion 35 but only above and below the touch screen portion 35. Alternatively, the non-functional band may be absent from above and below the touch screen portion 35, and only present on either lateral side of the touch screen portion 35. Alternatively, the non-functional band 37 is entirely omitted, and the entire touch screen 20 is functional (and thus the touch screen portion 35 is coextended and the same as the touch screen 20). The entire front face 60 can be made up of the touch screen 20, the entirety of which is functional, and considered the "touch screen portion." In each of these cases, the front face still has the curved portion 55.

Figure 2:
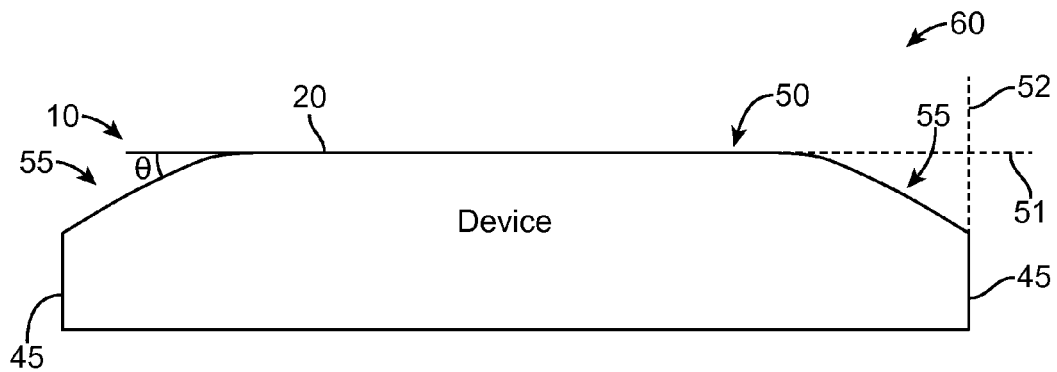
FIG. 2 is a diagram of an exemplary portable electronic device.

In order to illustrate the curved portion, a cross-section view of portable electronic device 10 is illustrated in FIG. 2 having a front face 60 with a flat portion 50 and an exaggerated curved portion 55. In the illustrated embodiment, the touch screen 20 extends across the front face 60 to also include the flat portion 50 and curved portion 55. The flat portion 50 extends horizontally within horizontal plane 51. Additionally, the side edge 45 extends within vertical plane 52. As shown, the curved portion 55 declines from the flat portion 50 to the side edge 45. Accordingly, the curved portion 55 can be described as a ramped decline or declining surface portion from the flat portion 50 to the side edge 45. The curved portion 55 in FIG. 2 is shown as slightly curved as it extends from the flat portion 50 to the side edge 45. As shown, the curved portion declines at angle θ from the flat portion 50 to side edge 45. The curved portion 55 may be straight, concave or otherwise curved as it extends to side edge 45. The curved portion 55 may also be considered as the portion of the front face which curves away from the flat portion 50 toward the periphery. In alternative embodiments, the touch screen 20 can be configured to conformance fit to the curvature of the flat portion 50 and curved portion 55 of the front face 60.

Figure 2A:
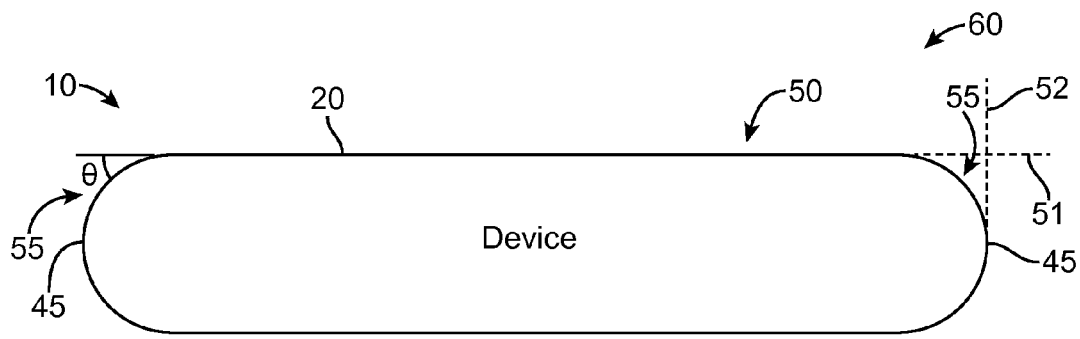
FIG. 2A is a diagram of an exemplary portable electronic device.

As described above, the side edge itself can be curved. For example as shown in FIG. 2A, the side edge 45 itself is curved. In such case, the extreme side end can be considered the side edge 45 toward which the curved portion 55 curves. Accordingly, the front face 60 has curved portion 55 which declines to side edge 45.

A glass screen protector as disclosed herein can be employed to protect the touch screen of the portable electronic device 10. However, glass is generally planar (or very slightly convex when oriented properly on the device) and thus cannot generally bend to accommodate the curved portions of portable electronic devices. As described above with respect to FIG. 1, a paint layer, which is disposed between the glass layer and the adhesive layer, corresponds to the shape of the curved portion of an portable electronic device in order to prevent unwanted glare and refraction of light from the glass layer of the screen protector and from the touch screen of the portable electronic device. This permits the glass screen protector to extend across the entire front face of a portable electronic device to the outer edge 45 of the device.

Figure 3:
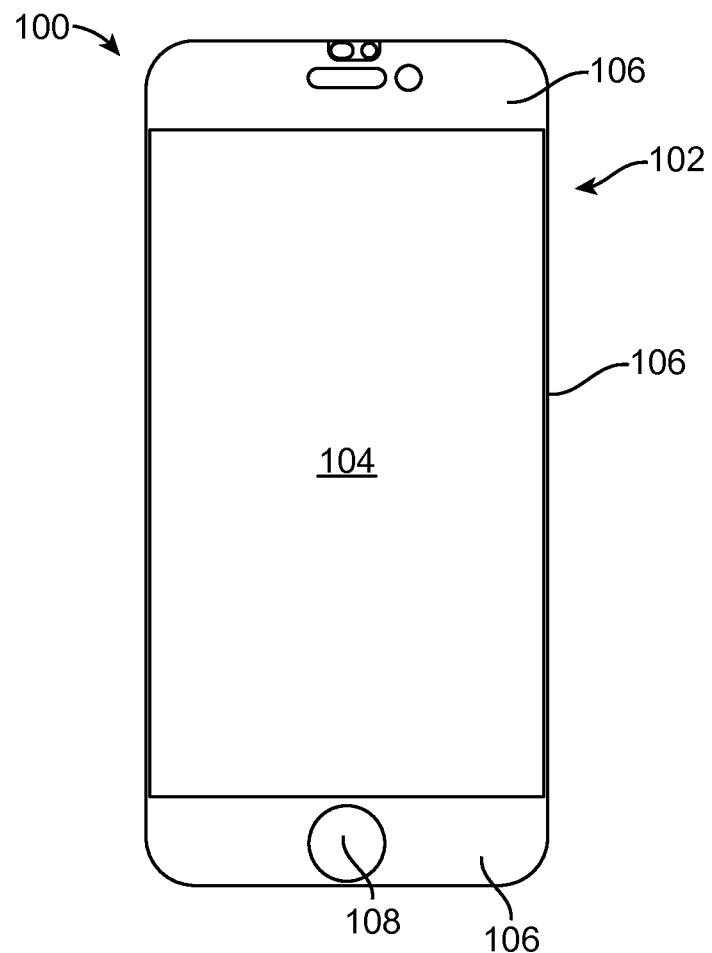
FIG. 3 is a diagram of one example of a glass touch screen protector according to the disclosure herein.

A top view of a glass touch screen protector in accordance with an exemplary embodiment is illustrated in FIG. 3. As shown, the glass touch screen protector 100 can correspond to the dimensions of a portable hand held device, and thus can be generally rectangular. However, the shape of the glass touch screen protector 100 is not limited to only generally rectangular shapes, but can be rounded or have other polygonal shapes to correspond to the shape of a desired device and touch screen. The glass touch screen protector 100 can include a glass sheet 102. The glass sheet 102 can be shaped and have dimensions that substantially correspond to the shape and dimensions of a front face of a portable electronic device.

The glass sheet 102 can include a transparent window portion 104 and a paint layer 106 serving as the opaque band surrounding the perimeter of the transparent window portion 104. In some examples, the transparent window portion 104 and the paint layer 106 can be different portions of a single component, for example the paint layer or other material can be embedded within the glass sheet 102 surrounding the window portion 104. In some examples, the transparent window portion 104 and the paint layer 106 can be different components. The transparent window portion 104 can substantially correspond to the touch screen portion of the portable electronic device. The light transmission of the transparent window portion 104 can be from 60 to 99%, alternatively from about 90%-99%. As noted, the paint layer 106 can serve as an opaque band, however, in other examples, non-opaque bands can be employed. Accordingly, in some embodiments, when the window portion 104 and the paint layer 106 are the same component, the opacity can be provided by a layer of ink or paint on the surface of the paint layer 106. Although a paint layer is employed in the illustrated example, other materials can be employed as an opaque band which reduces the transmission of light, for example anything which colors or reduces the transmission of light through the glass.

The paint layer 106 can essentially conform to the non-functional band that surrounds the touch screen portion. In other embodiments, the paint layer 106 can essentially conform to the non-functional band that surrounds the touch screen portion and the curved portion 55. The paint layer 106 can include one or more holes 108 corresponding to one or more buttons of the portable electronic device. For example, as shown, the paint layer 106 can have a hole 108 that corresponds to the on-off selector button of an iPhone or iPad. By exposing the buttons for ease of operation, the one or more holes 108 can act as alignment features to facilitate proper mounting of the glass touch screen protector 100 on the portable electronic device.

The glass sheet 102 can be sufficiently hard or stiff to prevent the glass sheet 102 from bending, cracking or collapsing under its own weight or sufficiently small applied forces such as touching or tapping by a user. The hardness of the glass sheet 102 can be between from 6 to about 9, alternatively from about 7 to about 9, as determined by Mohs scale of hardness values. In some embodiments, the hardness of the transparent window portion 104 can be more or less than about 6 and about 9 on the Mohs scale of hardness values.

The glass sheet 102 can be made of any suitable transparent material. The glass sheet 102 can be silica based. In some embodiments, the glass sheet 102 can be soda-lime glass, lead glass, flint glass, sodium borosilicate glass, oxide glass or any other suitable transparent material. In some embodiments, the glass sheet 102 can be made of Willow Glass™ by Corning Inc. of Corning, N.Y. In other embodiments, the glass sheet can be made of a non-glass type material such as an acrylic polymer such as poly(methyl methacrylate), a polycarbonate polymer such as Lexan®, or polyethylene terephthalate (PET).

Figure 4:
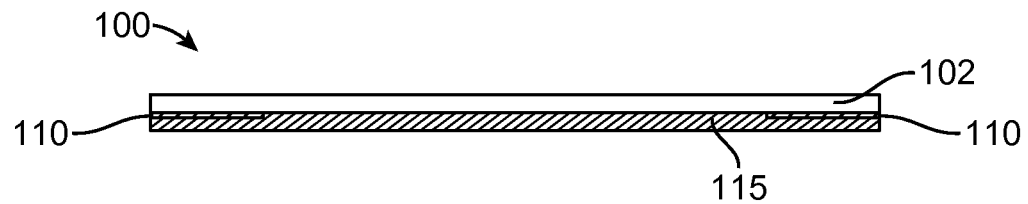
FIG. 4 is a diagram of one example of a glass touch screen protector according to the disclosure herein.

FIG. 4 illustrates a cross-sectional view of one example of a touch screen protector 100. Similar to the paint layer 106 shown in FIG. 3, the touch screen protector 100 can have a paint layer 110 shown in an exaggerated manner in the cross-sectional view of FIG. 4. The thickness of the touch screen protector can be in the range of about 0.1 mm to 1.0 mm, or alternatively, 0.1 mm to 0.6 mm. The paint layer 110 can be a band which can essentially conform to the non-functional band that surrounds the touch screen portion of a portable electronic device. The paint layer 110 can also be a band which can essentially conform to the non-functional band that surrounds the touch screen portion of a portable electronic device and a curved portion 55. The paint layer 110 can be 1.0 mm or less in thickness.

An adhesive layer 115 can be applied to the underside of the paint layer 110 and the interior portion of the glass sheet, for example the transparent portion 104. The adhesive layer 115 can be applied essentially to the entire underside of the glass sheet 102, whether directly or indirectly. For example, because the paint layer 110 extends only around the perimeter of the glass sheet 102, the adhesive layer 115 is applied to the paint layer 110 around this perimeter as well as directly to the glass sheet 102 in the interior portion, for example transparent portion 104. In at least one example, the adhesive layer is made of a silicone adhesive. In at least one example, the adhesive layer can be made of more than one adhesive composition. Preferably, the adhesive layer can have sufficient adhesiveness to mount the glass touch screen protector 100 to a portable electronic device multiple times for repeated removal and re-attachment, and enables the removal of the glass touch screen protector 100 without leaving adhesive residue on the portable electronic device. Various adhesives of this type are commercially available and a skilled artisan can select the particular adhesive for the specific application of the glass touch screen protector 100 to a portable electronic device. In some embodiments, the adhesive(s) can be silicon based such as a silicone adhesive, or alternatively acrylic, polyurethane (PU) or elastomer based adhesives. In general, any commercial available washable and reusable adhesive can be used herein.

For portable electronic devices that have non-functional boundaries that are not uniform, for example, the iPod Touch, the adhesive layer of the glass touch screen protector 100 can be configured in the same manner. In some embodiments, an adhesive can be applied only upon a portion of the perimeter, such as on top and bottom of a rectangular glass touch screen protector 100, when the side boundaries of the touch screen are very small so that the glass touch screen protector 100 can be mounted on the portable electronic device without blocking or interfering with the functional portions of the touch screen portion.

When the glass screen protector 100 shown in FIG. 4 is applied to the front face of a portable electronic device, such as those shown in FIGS. 1-2A, the glass screen protector can cover the entire front face. For example, the adhesive 115 could be pressed to contact the front face 60 of FIG. 1. However, due to the declining ramp of the curved portion 55, and the planar shape of the glass sheet 102, a portion of the glass screen protector 100 will "hang" over this curved portion 55. The paint layer 110 can be positioned so that this portion "hangs" over at least a portion of the curved portion 55. The paint layer 110 accordingly can hide any discoloration, unsightliness or irregularity which may arise as the glass screen protector 100 hangs over the curved portion 55. In an alternative embodiment, the portion of the glass screen protector 100 that "hangs" over this curved portion 55 can be configured to conformance fit to the shape of the curved portion 55. The paint layer 110 can be positioned so that this portion is located over the curved portion 55.

Figure 5:
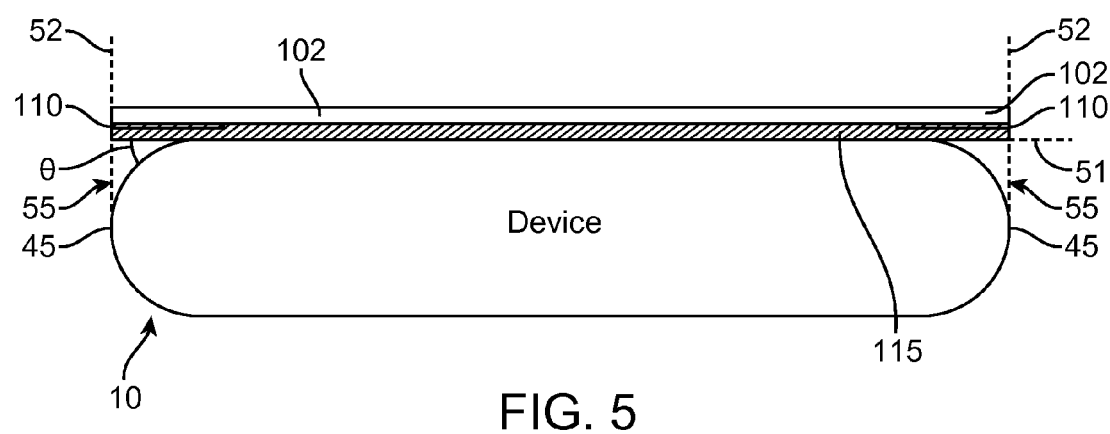
FIG. 5 is a diagram of one example of a glass touch screen protector mounted on an exemplary portable electronic device according to the disclosure herein.

An example of the paint layer positioned to "hang" or extend over the curved portion 55 is illustrated in FIG. 5. As shown in FIG. 5, the glass sheet 102 is mounted on the portable electronic device 10. The adhesive 115 is applied across the entire surface of the glass sheet 102. When pressed against the face, the adhesive 115 will removably attach the glass screen protector 100 to the portable electronic device 10. As shown, the glass screen protector extends to the side edge 45, the end of the glass screen protector substantially aligned with vertical plane 52 extending up from the side edge 45. Accordingly, a portion of the glass screen protector 100 overhangs the curved portion 55.

However, the paint layer 110 is positioned over the curved portion 55, and optionally any non-functional band. The paint layer 110 assists in hiding any discoloration, unsightliness or irregularity as a result of the glass screen protector 100 not contacting or adhering to the surface of the curved portion 55. Therefore, although the glass sheet 102 does not bend to accommodate the shape of the curved portion 55, the paint layer 110 can act to visually improve the look of the glass screen protector 100 mounted on a portable electronic device having a curved portion 55.

In some examples, an anti-shatter membrane can be adhered to the underside of the paint layer 110 and glass sheet 102. The anti-shatter membrane prevents the glass sheet 102 from shattering, and if it shatters, aids in preventing the glass from breaking into smaller scattered pieces which can endanger the fingers of a user. The anti-shatter membrane can be made up of a transparent flexible polymeric material such as PET or other material. The anti-shatter membrane can be adhered to the glass sheet 102 and paint layer 110 by a strong adhesive, for example an optical grade acrylic adhesive. The anti-shatter membrane can be from 0.05 to 0.25 mm in thickness. Alternatively the anti-shatter membrane can be from 0.1 to 0.2 mm in thickness. Here, the adhesive layer can be applied to an underside of the anti-shatter membrane. The anti-shatter membrane can be bonded to the glass sheet 102 and paint layer 110 by a strong adhesive, for example an acrylic adhesive, for example an optical grade acrylic adhesive.

The touch screen protector can be compressed to cause the glass to be one or more of strengthened, tempered, and convexed. As described above, the glass sheet is generally planar. However, due to the strengthening process, the glass can become slightly curved (e.g. convexed when placed over a touch screen as disclosed herein). However, because this is a slight effect, the touch screen protector can be considered generally planar for practical purposes herein. For example, the touch screen protector can become convex by applying different amounts of pressure when the touch screen protector is compressed. The touch screen protector can be convex with respect to the touch screen portion of the portable electronic device when the glass touchscreen protector 100 is adhered to the portable electronic device.

Figure 6:
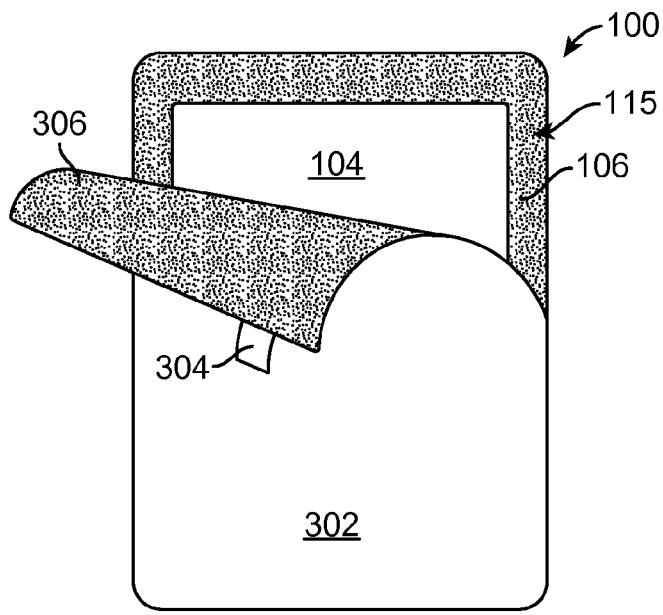
FIG. 6 is a back view of the glass touch screen protector with a portion of the backing member removed in accordance with an exemplary embodiment.

Referring to FIG. 6, a back view of a glass touch screen protector having a backing member in accordance with an exemplary embodiment is illustrated. As shown, the glass touch screen protector 100 can further include a backing member 302 to protect a back side of the touch screen protector 100 and adhesive layer 115. The adhesive layer 115 can be provided along the paint layer 106 alone, or additionally across window portion 104. The back side of the glass touch screen protector 100 is the side that is closest to the portable electronic device when the glass touch screen protector 100 is adhered to the portable electronic device. The backing member 302 can include a tab 304 to assist in the removal of the backing member 302 prior to mounting the glass touch screen protector 100 onto the portable electronic device. By grasping and pulling on the tab 304, the backing member 302 can be removed completely from the glass touch screen protector 100 thereby exposing adhesive layer 115 prior to mounting the glass touch screen protector 100 to the touch screen of the portable electronic device. The backing member 302 can include surface 306 which permits adherence of the backing member 302 to the back side of the glass touch screen protector 100 as well as easy removal, and can optionally have adhesive thereon. There are various adhesives as described herein that are commercially available and a skilled artisan can select the particular adhesive for the specific application of adhering the backing member 302 to the back side of the glass touch screen protector 100. The adhesiveness of any adhesive on surface 306 can be weaker than the adhesive layer 115 on the glass sheet 102 (which may include an anti-shatter membrane).

A method for adhering a glass touch screen protector to a portable electronic device in accordance with an exemplary embodiment is also disclosed. The exemplary method is provided by way of example, as there are a variety of ways to carry out the method.

Figure 7:
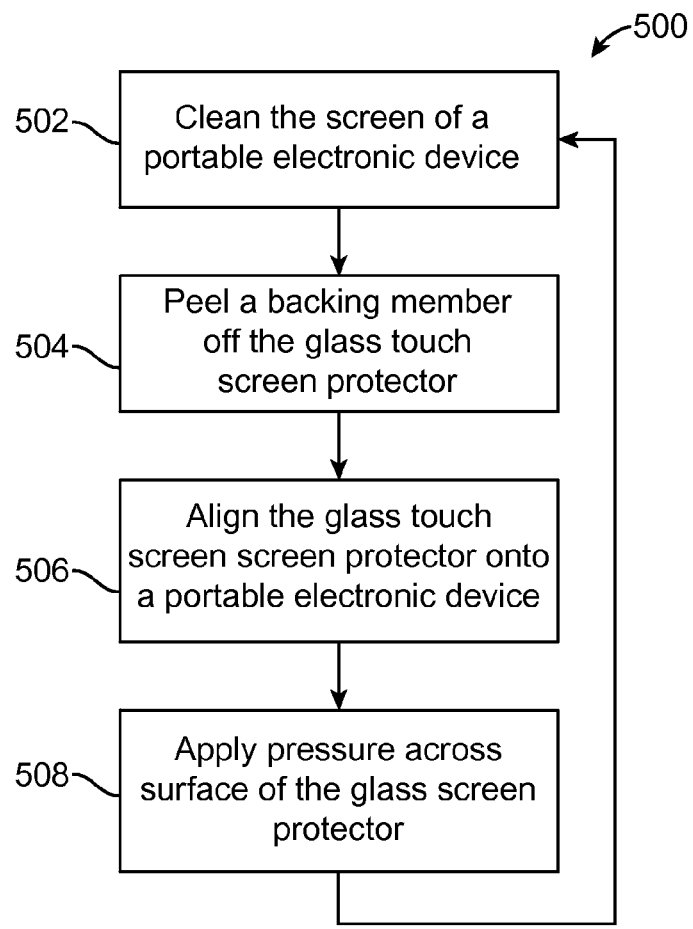
FIG. 7 is an exemplary flowchart for applying a glass touch screen protector to a portable electronic device.

Referring to FIG. 7, a method for adhering a glass touch screen protector to a portable electronic device in accordance with an exemplary embodiment is illustrated. The exemplary method 500 is provided by way of example, as there are a variety of ways to carry out the method. The method 500 described below can be carried out using the configurations illustrated in FIGS. 1-6 by way of example, and various elements of these figures are referenced in explaining exemplary method 500. Each block shown in FIG. 7 represents one or more processes, methods or subroutines, carried out in the exemplary method 500. The exemplary method 500 can begin at block 502.

At block 502, the screen of a portable electronic device is cleaned. For example, a user can use a microfiber cloth or other suitable cleaner to wipe away any dust particles on the screen of portable electronic device 10. The microfiber cloth can be included in the original packaging or can be an aftermarket microfiber cloth. After cleaning the screen of the portable electronic device 10, the method can proceed to block 504. At block 504, a backing member is peeled off of the glass touch screen protector. For example, the backing member 302 can be removed to expose the adhesive layer 115 protected by the backing member 302. After removing the backing member 302, the method 500 can proceed to block 506. At block 506, the glass touch screen protector is aligned onto the portable electronic device. For example, a user can align the bottom of the glass touch screen protector 100 at the bottom including aligning any button holes. After aligning the glass touch screen protector 100 onto the portable electronic device 10, the method 500 can proceed to block 508. At block 508, pressure is applied around the borders of the glass touch screen protector to mount the glass touch screen protector on the portable electronic device. For example, the user can apply pressure on the glass touch screen protector 100, thereby pressing the adhesive layer 115 against the portable electronic device 10, to mount the glass touch screen protector 100 onto the portable electronic device 10. After the glass touch screen protector 100 is mounted on the portable electronic device, the glass touch screen protector 100 can be removed and re-mounted.

To assist in preventing or avoiding the generation of interference fringes during normal use, micro-particles can be applied to the underside of the glass sheet 102 and/or the transparent window portion 104. The micro-particles can be applied to the underside of a glass sheet 102 and/or the transparent window portion 104 (or a PET layer on its underside).

The glass touch screen protector 100 can have the advantage of being able to be installed easily and quickly, for example, within 30 seconds or less. Because the installation process can be so quick, when properly applied, dust is less likely to be trapped in between the touch screen portion of the portable electronic device and the glass touch screen protector 100.

The glass touch screen protector 100 can be removed for cleaning and re-application as necessary. For example, the glass touch screen protector 100 can be cleaned by rinsing with water and air drying. Small amounts of dishwashing detergent can be applied if needed. Any debris or dust caught on the touch screen portion can be removed, for example, using a microfiber cloth. Once done rinsing, the glass touch screen protector 100 can be placed, adhesive side up, onto a towel and allowed to air dry. After the glass touch screen protector 100 is dry and clean, it can be reapplied to the portable electronic device.

The various embodiments described above are provided by way of illustration only and should not be construed to limit the scope of the disclosure. Various modifications and changes can be made to the principles and embodiments described herein without departing from the scope of the disclosure and without departing from the claims which follow.

What is claimed is:

1. A method comprising:
mounting a touch screen protector to a front face of a portable electronic device, the front face having a declining surface portion extending along an outer perimeter thereof,
the touch screen protector comprising:
a planar sheet having a front side and a back side, an outer perimeter corresponding in shape to the device, and a transparent window portion;
an opaque band applied around the perimeter of the planar sheet, surrounding the transparent window portion;
an adhesive layer applied to the back side of the planar sheet for mounting the touch screen protector on the device; and
wherein the planar sheet is sufficiently stiff such that a portion of the glass touch screen protector hangs over the declining surface portion of the front face of the portable electronic device when mounted thereon.

2. The method of claim 1, wherein the planar sheet is a glass sheet.

3. The method of claim 1, wherein the opaque band is a paint layer.

4. The method of claim 1, wherein the adhesive layer is applied to the transparent window portion.

5. The method of claim 1, further comprising an anti-shatter membrane arranged between the planar sheet and the adhesive layer.

6. The method of claim 1, wherein the planar sheet extends to an outer edge of the portable electronic device.

7. The method of claim 1, wherein the adhesive layer has a strength enabling repeated removal and re-attachment.

8. The method of claim 1, further comprising removing a backing member from the touch screen protector.

9. The method of claim 3, further comprising positioning the opaque layer is over the declining surface portion of the portable electronic device.

10. The method of claim 2, wherein the glass sheet has a hardness of about 6 to about 9, as determined by Mohs scale of hardness values.

11. The method of claim 3, wherein the paint layer is disposed between the planar sheet and the adhesive layer.

* * * * *